US012252909B2

(12) United States Patent
Kato et al.

(10) Patent No.: US 12,252,909 B2
(45) Date of Patent: Mar. 18, 2025

(54) VEHICLE DOOR LOCK SYSTEM

(71) Applicants: AISIN CORPORATION, Kariya (JP); TOYOTA JIDOSHA KABUSHIKI KAISHA, Toyota (JP)

(72) Inventors: Daiki Kato, Kariya (JP); Natsumi Onodera, Kariya (JP); Hisashi Itonaga, Kariya (JP); Toshitsugu Oda, Kariya (JP); Yoshihiro Yamaguchi, Kariya (JP); Shinsuke Takayanagi, Kariya (JP); Shunsuke Kanagai, Anjo (JP); Nobuo Hayama, Kariya (JP); Tsubasa Ikeuchi, Kariya (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 163 days.

(21) Appl. No.: 18/162,929

(22) Filed: Feb. 1, 2023

(65) Prior Publication Data

US 2023/0295966 A1 Sep. 21, 2023

(30) Foreign Application Priority Data

Mar. 16, 2022 (JP) ................................ 2022-041200

(51) Int. Cl.
*E05B 83/38* (2014.01)
*E05B 81/06* (2014.01)
(Continued)

(52) U.S. Cl.
CPC .............. *E05B 83/38* (2013.01); *E05B 83/40* (2013.01); *E05B 85/04* (2013.01); *E05B 85/24* (2013.01); *E05B 81/06* (2013.01); *E05B 81/18* (2013.01)

(58) Field of Classification Search
CPC .......... E05B 81/00; E05B 81/02; E05B 81/04; E05B 81/06; E05B 81/12; E05B 81/18;
(Continued)

(56) References Cited

U.S. PATENT DOCUMENTS

2002/0027375 A1* 3/2002 Wattebled .............. E05B 83/40 296/146.1
2005/0264031 A1* 12/2005 Mitsui .................... E05B 85/24 296/146.9
(Continued)

FOREIGN PATENT DOCUMENTS

JP 2005-88812 A 4/2005
JP 2020-111311 A 7/2020
JP 2021-95706 A 6/2021

OTHER PUBLICATIONS

JP-2005088812-A (Year: 2005).*

*Primary Examiner* — Nathan Cumar
(74) *Attorney, Agent, or Firm* — Oblon, McClelland, Maier & Neustadt, L.L.P.

(57) ABSTRACT

A vehicle door lock system is applied to a vehicle including a vehicle body having a door opening and a door, and the vehicle door lock system includes a striker structure installed at one of the vehicle body and the door and a door lock device installed at the other of the vehicle body and the door, the striker structure includes a first engagement portion and a second engagement portion disposed away from each other in the width direction, the door lock device includes a hook that is displaced between a locking position where the hook is allowed to be locked to the first engagement portion and a retraction position where the hook is not allowed to be locked to the first engagement portion, and the hook is positioned between the first engagement portion and the
(Continued)

second engagement portion in the width direction when positioned at the locking position.

7 Claims, 10 Drawing Sheets

(51) Int. Cl.

| | |
|---|---|
| ***E05B 81/18*** | (2014.01) |
| ***E05B 83/40*** | (2014.01) |
| ***E05B 85/04*** | (2014.01) |
| ***E05B 85/24*** | (2014.01) |

(58) Field of Classification Search
CPC .......... E05B 81/20; E05B 83/00; E05B 83/36; E05B 83/38; E05B 83/40; E05B 85/00; E05B 85/02; E05B 85/04; E05B 85/045; E05B 85/20; E05B 85/24; E05B 85/243; E05B 85/245; E05B 85/247; E05B 85/26
USPC .......................................................... 70/277
See application file for complete search history.

(56) References Cited

U.S. PATENT DOCUMENTS

| | | | | |
|---|---|---|---|---|
| 2016/0340938 | A1* | 11/2016 | Chiba ..................... | E05B 77/22 |
| 2017/0241167 | A1 | 8/2017 | Alarcon Hernandez | |
| 2019/0135349 | A1 | 5/2019 | Nusier et al. | |
| 2020/0165845 | A1* | 5/2020 | Izumi ...................... | E05B 77/02 |
| 2021/0180370 | A1 | 6/2021 | Oda et al. | |

* cited by examiner

VEHICLE DOOR LOCK SYSTEM

CROSS REFERENCE TO RELATED APPLICATIONS

This application is based on and claims priority under 35 U.S.C. § 119 to Japanese Patent Application No. 2022-041200, filed on Mar. 16, 2022, the entire content of which is incorporated herein by reference.

TECHNICAL FIELD

The present disclosure relates to a vehicle door lock system.

BACKGROUND DISCUSSION

JP 2005-88812 A describes a vehicle including a vehicle body having a door opening, and a front slide door and a rear slide door that open and close the door opening. The front slide door slides forward to open the front half of the door opening. The rear slide door slides rearward to open the rear half of the door opening.

As described above, in a vehicle including a double slide door, a striker cannot be installed in the center pillar because the center pillar does not exist. Therefore, the vehicle as described above requires a mechanism for restraining the slide door at the fully closed position. Such an actual situation is also common in a case where a slide door that is not a double door is restrained to the vehicle body without the center pillar.

A need this exists for a vehicle door lock system which is not susceptible to the drawback mentioned above.

SUMMARY

A vehicle door lock system is applied to a vehicle including a vehicle body having a door opening on at least one side of the vehicle in a width direction and a door that opens and closes the door opening, and the vehicle door lock system includes a striker structure installed at one of the vehicle body and the door, and a door lock device installed at the other of the vehicle body and the door, wherein the striker structure includes a first engagement portion and a second engagement portion disposed away from each other in the width direction, wherein the door lock device includes a hook that is displaced between a locking position where the hook is allowed to be locked to the first engagement portion and a retraction position where the hook is not allowed to be locked to the first engagement portion, and wherein the hook is positioned between the first engagement portion and the second engagement portion in the width direction when positioned at the locking position.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
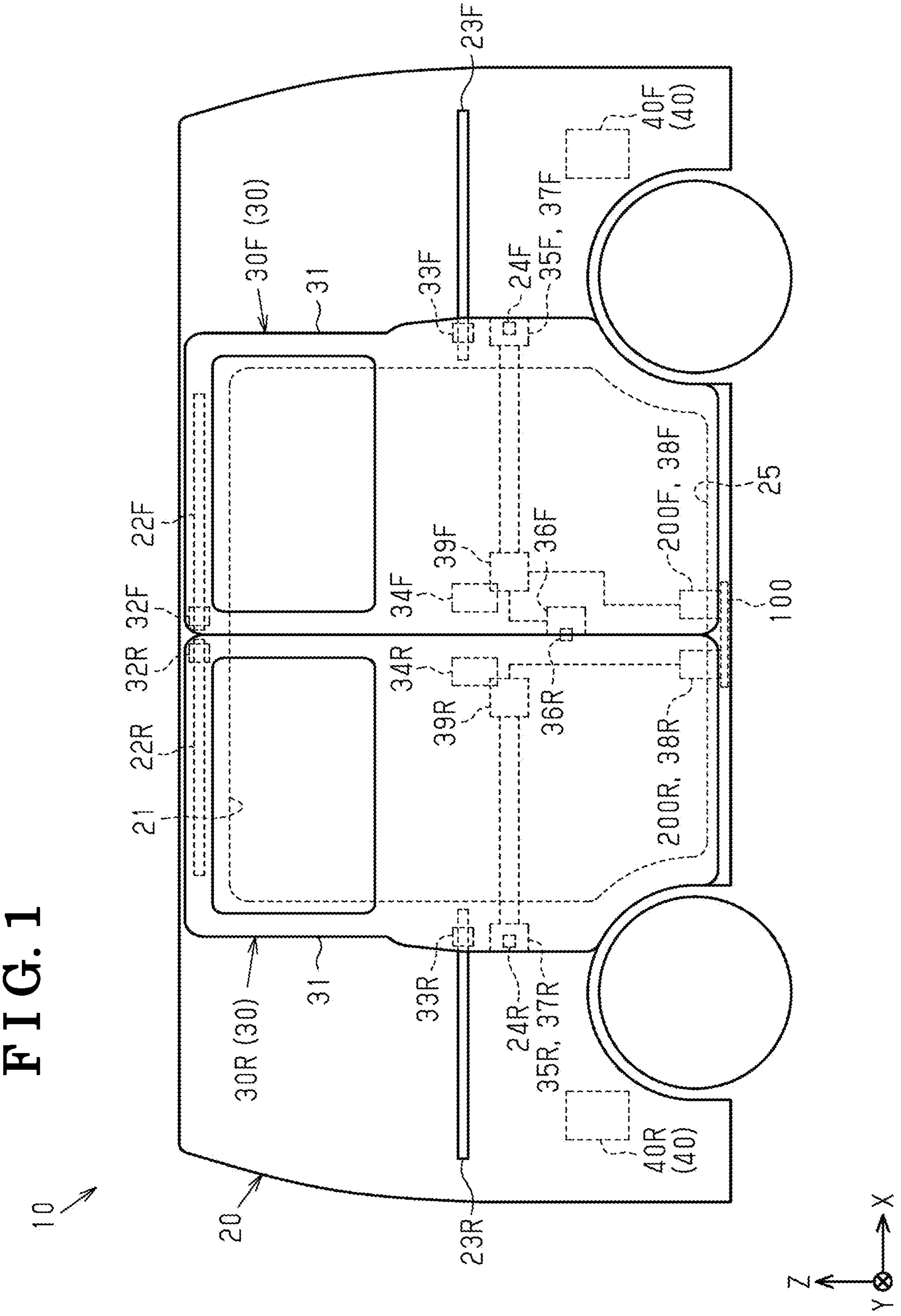
FIG. 1 is a side view illustrating a schematic configuration of a vehicle.

Hereinafter, an embodiment of a vehicle including a vehicle door lock system (hereinafter, also referred to as a "door lock system") will be described. In the drawing, an X-axis is an axis extending in the vehicle front-rear direction, a Y-axis is an axis extending in the vehicle width direction, and a Z-axis is an axis extending in the vehicle vertical direction. In the following description, the vehicle front-rear direction is also referred to as a front-rear direction, the vehicle width direction is also referred to as a width direction, and the vehicle vertical direction is also referred to as a vertical direction.

<Vehicle 10>

As illustrated in FIG. 1, a vehicle 10 includes a vehicle body 20, a slide door 30, and a door drive unit 40.

<Vehicle Body 20>

Figure 2:
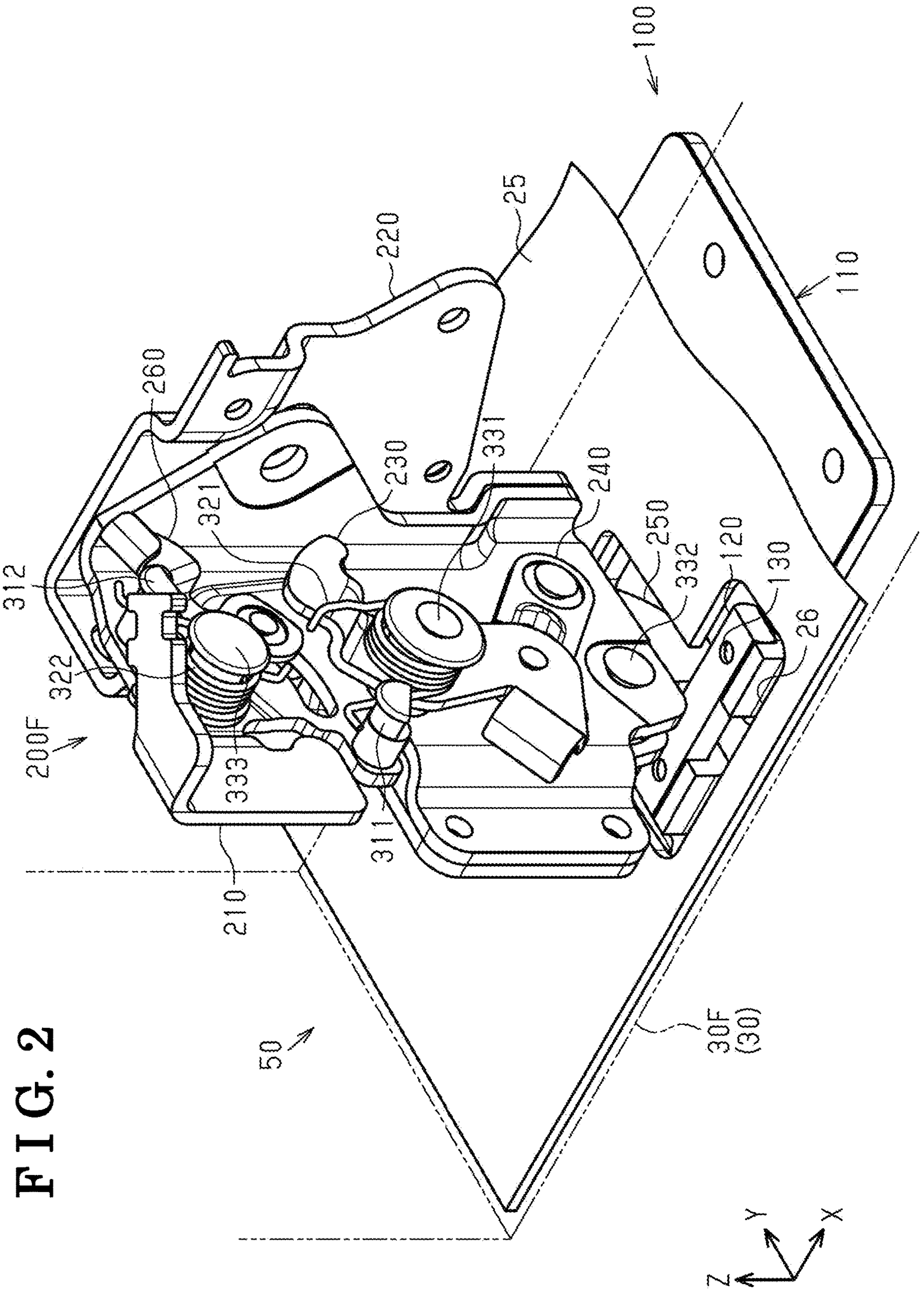
FIG. 2 is a perspective view of a lower striker structure and a lower lock device.

As illustrated in FIG. 1, the vehicle body 20 includes a door opening 21, upper rails 22F and 22R, center rails 23F and 23R, a front striker 24F, and a rear striker 24R. As illustrated in FIGS. 1 and 2, the vehicle body 20 includes a floor panel 25 and a lower striker structure 100.

The door opening 21 is open on at least one side of the vehicle body 20 in the width direction. In a region where leftward traffic of the vehicle 10 is used, the door opening 21 is preferably open at least on the left side of the vehicle 10. On the other hand, in a region where right-side traffic of the vehicle 10 is used, it is preferable that the door opening 21 is open at least on the right side of the vehicle 10.

The upper rails 22F and 22R are disposed above the door opening 21, and the center rails 23F and 23R are disposed below the upper rails 22F and 22R. The upper rail 22F is disposed ahead of the center of the door opening 21 in the front-rear direction, and the center rail 23F is disposed ahead of the door opening 21. The upper rail 22R is disposed behind the center of the door opening 21 in the front-rear direction, and the center rail 23R is disposed behind the door opening 21. The upper rails 22F and 22R and the center rails 23F and 23R mainly have the longitudinal direction in the front-rear direction.

The front striker 24F is disposed ahead of the door opening 21. The rear striker 24R is disposed behind the door opening 21. The lower striker structure 100 is disposed below the door opening 21. The lower striker structure 100 will be described in detail later.

As illustrated in FIG. 2, the floor panel 25 has a plate shape. The floor panel 25 constitutes a bottom portion of the vehicle interior. The floor panel 25 has a through hole 26 through which the lower striker structure 100 is exposed upward. Although not illustrated in FIGS. 1 and 2, two through holes 26 are provided away from each other in the front-rear direction in the floor panel 25. The through hole 26 has a T-shape in plan view in the vertical direction.

<Slide Door 30>

As illustrated in FIG. 1, the slide door 30 includes a front door 30F that opens and closes a front half of the door opening 21 and a rear door 30R that opens and closes a rear half of the door opening 21.

The front door 30F slides forward to perform an opening operation, and slides backward to perform a closing operation. On the other hand, the rear door 30R slides backward to perform an opening operation, and slides forward to perform a closing operation. That is, the front door 30F and the rear door 30R move in directions away from each other to perform an opening operation, and move in directions approaching each other to perform a closing operation. In this way, the front door 30F and the rear door 30R are opened and closed between a "fully opened position" where the door opening 21 is fully opened and a "fully closed position" where the door opening 21 is fully closed. The front door 30F and the rear door 30R correspond to "doors".

<Front Door 30F>

As illustrated in FIG. 1, the front door 30F includes a door body 31, an upper guide unit 32F, a center guide unit 33F, and a door handle 34F. The front door 30F includes a front lock device 35F, a center lock device 36F, a lower lock device 200F, a front lock drive device 37F, a lower lock drive device 38F, and a remote controller 39F.

The door body 31 has a rectangular shape corresponding to the shape of the front half of the door opening 21 in side view. The door body 31 has an inner panel and an outer panel that are positioned away from each other in the width direction. Some of the components of the front door 30F are accommodated in a space between the inner panel and the outer panel. Although not illustrated, a seal member is attached along an outer edge of the door body 31 to a face, of the door body 31, facing inward in the width direction. The seal member is elastically compressed between the front door 30F located at the fully closed position and the door opening 21. In this way, the seal member prevents rain from entering the vehicle interior from between the front door 30F and the door opening 21.

The upper guide unit 32F is fixed to an upper end portion of the door body 31 and a rear end portion of the door body 31. The upper guide unit 32F is engaged with the upper rail 22F so as to be movable in the longitudinal direction of the upper rail 22F. The center guide unit 33F is fixed to a front end portion, of the door body 31, which is an intermediate portion of the door body 31 in the vertical direction. The center guide unit 33F is engaged with the center rail 23F so as to be movable in the longitudinal direction of the center rail 23F. When the upper guide unit 32F and the center guide unit 33F move along the upper rail 22F and the center rail 23F, respectively, the front door 30F can move in the front-rear direction with respect to the vehicle body 20.

The door handle 34F is an inside door handle provided on a face, of the door body 31, facing the inside of the vehicle 10. The door handle 34F may be an outside door handle provided on a face, of the door body 31, facing the outside of the vehicle 10.

The front lock device 35F is provided at a front end portion of the door body 31 and at an intermediate portion of the door body 31 in the vertical direction. The front lock device 35F is configured to be switchable between a locked state in which it is locked to the front striker 24F and a released state in which it is not locked to the front striker 24F. The front lock device 35F is switched to the locked state to restrain the front end portion of the front door 30F located at the fully closed position to the vehicle body 20. On the other hand, the front lock device 35F is switched to the released state to release the restraint of the front door 30F located at the fully closed position.

The center lock device 36F is provided at a rear end portion of the door body 31 and at an intermediate portion of the door body 31 in the vertical direction. The center lock device 36F is switchable between a locked state in which it is locked to a center striker 36R of the rear door 30R to be described later and a released state in which it is not locked to the center striker 36R. The center lock device 36F is switched to the locked state to connect the rear end portion of the front door 30F with the front end portion of the rear door 30R located at the fully closed position. On the other hand, the center lock device 36F is switched to the released state to release the connection between the front door 30F and the rear door 30R located at the fully closed position.

The lower lock device 200F is provided at the rear end portion of the door body 31 and at the lower end portion of the door body 31. The lower lock device 200F is switchable between a locked state in which it is locked to the lower striker structure 100 and a released state in which it is not locked to the lower striker structure 100. The lower lock device 200F is switched to the locked state to restrain the lower end portion of the front door 30F located at the fully closed position to the vehicle body 20. On the other hand, the lower lock device 200F is switched to the released state to release the restraint of the front door 30F located at the fully closed position. Details of the lower lock device 200F will be described later.

The front lock drive device 37F shifts the front lock device 35F from the released state to the locked state, or shifts the front lock device 35F from the locked state to the released state. The front lock drive device 37F shifts the front lock device 35F from the released state to the locked state after the front door 30F is operated to close to the nearly full close position in the vicinity of the fully closed position. On the other hand, the front lock drive device 37F shifts the front lock device 35F from the locked state to the released state when the front door 30F is opened from the fully closed position.

The lower lock drive device 38F shifts the lower lock device 200F from the released state to the locked state. The lower lock drive device 38F shifts the lower lock device 200F to the locked state after the front lock drive device 37F shifts the front lock device 35F to the locked state, that is, after the front door 30F is operated to close to the fully closed position.

The remote controller 39F relays power transmitted between the door handle 34F, the front lock drive device 37F, the center lock device 36F, and the lower lock device 200F. Specifically, the remote controller 39F transmits power to the center lock device 36F and the lower lock device 200F when the front lock drive device 37F shifts the front lock device 35F to the released state. Then, the remote controller 39F shifts the center lock device 36F and the lower lock device 200F from the locked state to the released state. In addition, the remote controller 39F transmits power to the front lock device 35F, the center lock device 36F, and the lower lock device 200F when the user operates the door handle 34F. Then, the remote controller 39F shifts the front lock device 35F, the center lock device 36F, and the lower lock device 200F from the locked state to the released state.

The lower lock device 200F of the front door 30F corresponds to a "door lock device" and a "front door lock device". The lower lock drive device 38F of the front door 30F corresponds to a "drive unit".

<Rear Door 30R>

As illustrated in FIG. 1, the rear door 30R includes the door body 31, an upper guide unit 32R, a center guide unit 33R, and a door handle 34R. The rear door 30R includes a rear lock device 35R, the center striker 36R, a rear lock drive device 37R, a lower lock device 200R, a lower lock drive device 38R, and a remote controller 39R.

The rear door 30R is configured substantially as in the front door 30F. It is difference from the front door 30F in that the rear lock device 35R and the rear lock drive device 37R are provided instead of the front lock device 35F and the front lock drive device 37F, and the center striker 36R is provided instead of the center lock device 36F. Therefore, in the rear door 30R, the description of the configuration excluding the center striker 36R is omitted.

The center striker 36R is installed at a front end portion of the rear door 30R and at an intermediate portion in the vertical direction. In other words, the center striker 36R is installed at a position facing the center lock device 36F of the front door 30F in the front-rear direction. The center striker 36R is an object to be locked by the center lock device 36F.

The lower lock device 200R of the rear door 30R corresponds to a "door lock device" and a "rear door lock device". The lower lock drive device 38R of the rear door 30R corresponds to a "drive unit".

<Door Drive Unit 40>

As illustrated in FIG. 1, the door drive unit 40 includes a front door drive unit 40F that drives the front door 30F in the opening/closing direction, and a rear door drive unit 40R that drives the rear door 30R in the opening/closing direction. The front door drive unit 40F and the rear door drive unit 40R each include, for example, a motor and a transmission mechanism that transmits power of the motor to the slide door 30. The transmission mechanism of each of the front door drive unit 40F and the rear door drive unit 40R can include a pulley and a belt, or can include a drum and a cable. The front door drive unit 40F and the rear door drive unit 40R can be incorporated in the slide door 30. The front door 30F and the rear door 30R can be said to be so-called power slide doors in that they are opened and closed by the front door drive unit 40F and the rear door drive unit 40R, respectively.

<Lower Striker Structure 100>

Figure 3:
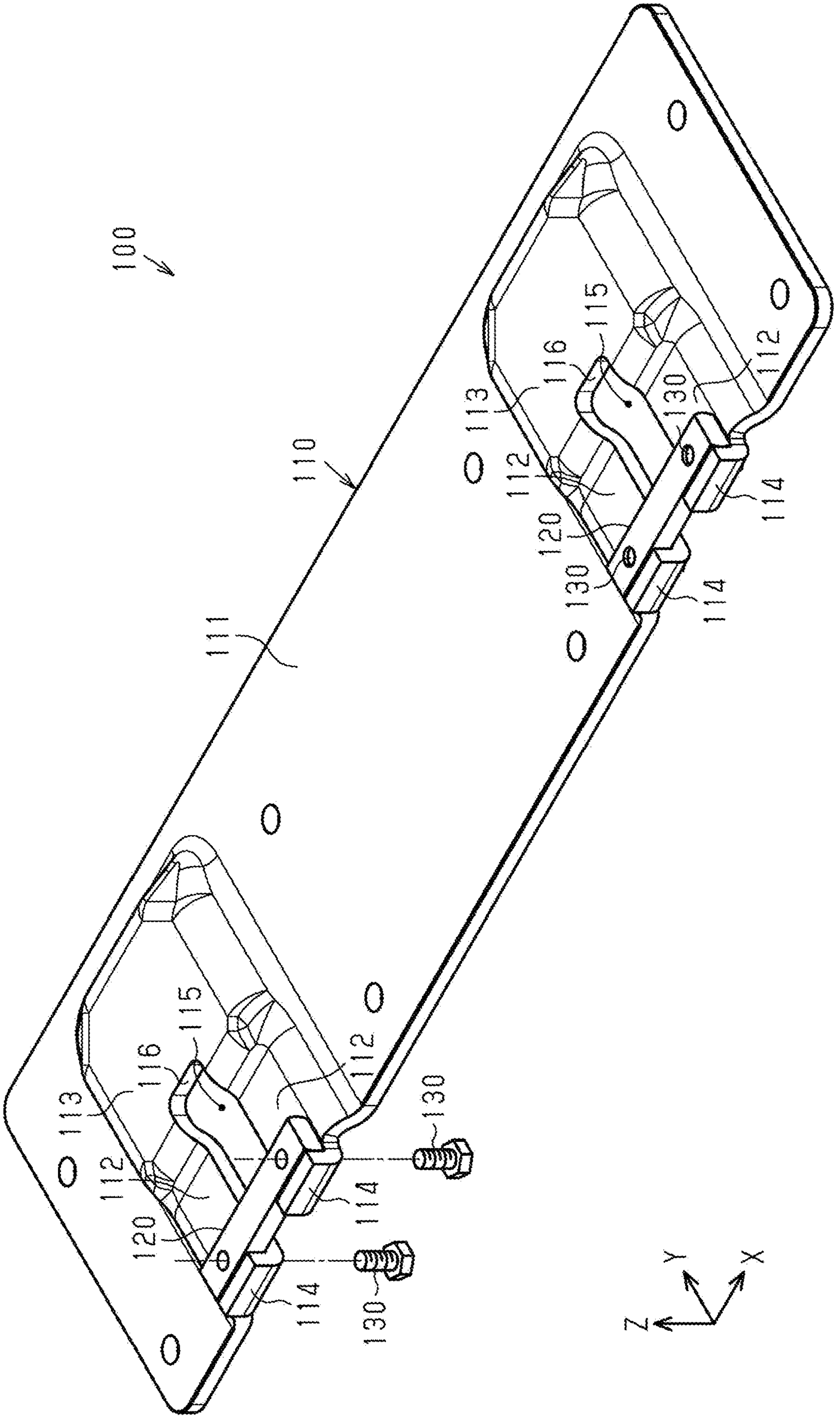
FIG. 3 is a perspective view of the lower striker structure.
Figure 4:
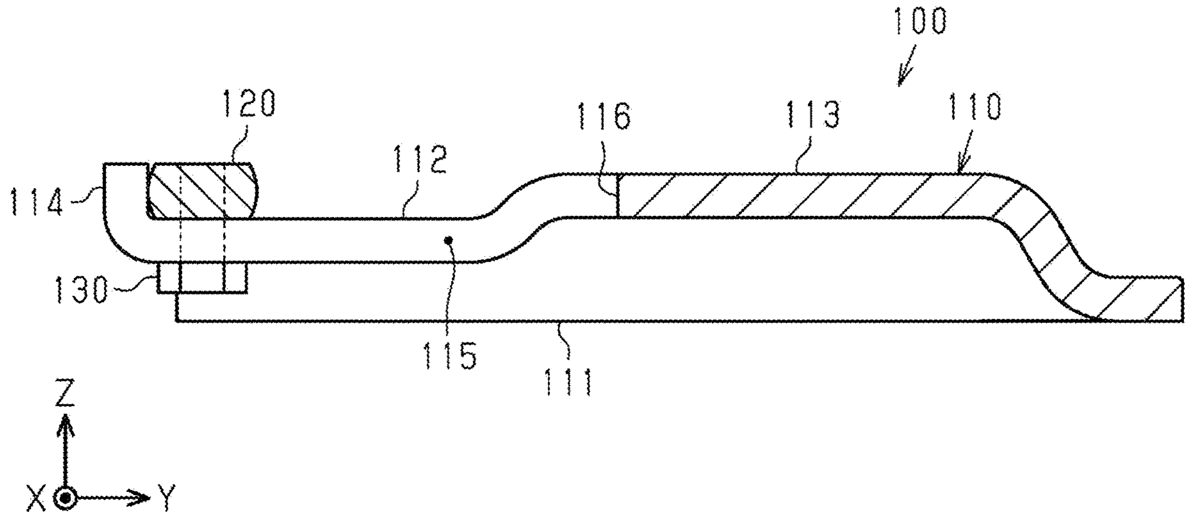
FIG. 4 is a cross-sectional view of the lower striker structure.

As illustrated in FIGS. 3 and 4, the lower striker structure 100 includes a base plate 110, two first engagement portions 120, and a plurality of fastening members 130. As illustrated in FIG. 3, the lower striker structure 100 has a symmetrical structure with respect to the front-rear direction. Therefore, in the following description, the front half of the lower striker structure 100 will be mainly described.

As illustrated in FIGS. 3 and 4, the base plate 110 has a rectangular plate shape. The base plate 110 is formed by, for example, pressing a metal plate. The base plate 110 has a first portion 111 that occupies most of the base plate 110. The front portion of the base plate 110 includes a second portion 112 located above the first portion 111, a third portion 113 located above the second portion 112, two bent portions 114 extending from the second portion 112, and a slit 115 extending in the width direction.

The first portion 111, the second portion 112, and the third portion 113 each have a flat plate shape.

The plate thicknesses of the first portion 111, the second portion 112, and the third portion 113 are equal to each other. The plate thickness direction of the first portion 111, the second portion 112, and the third portion 113 is substantially the vertical direction.

The first portion 111 is, for example, a portion fixed to a frame structure, a monocoque structure, or the like of the vehicle body 20. The first portion 111 is also a portion to which the floor panel 25 is fixed. The second portion 112 bulges upward with respect to the first portion 111. A boundary portion between the second portion 112 and the first portion 111 is curved with respect to the first portion 111. The third portion 113 bulges upward with respect to the first portion 111 and the second portion 112. A boundary portion of the third portion 113 between the second portion 112 and the third portion 113 is curved. The third portion 113 is adjacent to the second portion 112 in the width direction. The third portion 113 is located inward in the width direction relative to the second portion 112.

The two bent portions 114 are bent from the second portion 112 in a state of being spaced apart in the front-rear direction. Specifically, the two bent portions 114 slightly extend outward in the width direction and then extend upward at both sides of the slit 115. Therefore, when the two bent portions 114 are viewed from the front-rear direction, the two bent portions 114 each have an L shape. The length of each of the two bent portions 114 in the width direction are shorter than the length of each of the two bent portions 114 in the vertical direction.

The slit 115 extends from the second portion 112 to the third portion 113. Therefore, the slit 115 divides the second portion 112 in the front-rear direction. The bottom of the slit 115 is located at the third portion 113. In the following description, a portion constituting the bottom portion of the slit 115 in the third portion 113 is referred to as a second engagement portion 116. The slit 115 has a rectangular shape with the front-rear direction as the short direction and the width direction as the longitudinal direction in plan view in the vertical direction. That is, the width direction of the slit 115 is the front-rear direction.

The first engagement portion 120 has a rod shape whose axial direction is the front-rear direction. The length of the first engagement portion 120 in the axial direction is longer than the width of the slit 115 of the base plate 110. A cross-sectional shape orthogonal to the axial direction of the first engagement portion 120 is an oval shape. In another embodiment, the cross-sectional shape orthogonal to the axial direction of the first engagement portion 120 may be a circular shape or a polygonal shape.

The first engagement portion 120 is fixed to the base plate 110 so as to straddle the slit 115. Specifically, the first engagement portion 120 is fixed to the second portion 112 by two fastening members 130. At this time, the first engagement portion 120 is located above the second portion 112.

The first engagement portion 120 is in contact with the two bent portions 114 in the width direction. The two fastening members 130 fasten the first engagement portion 120 to the second portion 112 from below the second portion 112.

As illustrated in FIG. 3, in the lower striker structure 100, the first engagement portion 120 and the second engagement portion 116 on the front side are objects to be locked by the lower lock device 200F of the front door 30F.

On the other hand, the first engagement portion 120 and the second engagement portion 116 on the rear side are objects to be locked by the lower lock device 200R of the rear door 30R. In this regard, in the lower striker structure 100 of the present embodiment, it can be said that objects to be locked by the lower lock device 200F of the front door 30F and the lower lock device 200R of the rear door 30R are provided in one base plate 110.

Further, the front first engagement portion 120 corresponds to a "first front engagement portion", and the rear first engagement portion 120 corresponds to a "first rear engagement portion". The front second engagement portion 116 corresponds to a "second front engagement portion", and the rear second engagement portion 116 corresponds to a "second rear engagement portion". Further, the lower striker structure 100 corresponds to a "striker structure".

<Lower Lock Device 200F, 200 R>

Hereinafter, the lower lock devices 200F and 200R will be described in detail. The lower lock device 200F of the front door 30F and the lower lock device 200R of the rear door 30R are symmetrical with respect to the front-rear direction. Therefore, in the following description, the lower lock device 200F of the front door 30F will be described.

As illustrated in FIGS. 5 to 8, the lower lock device 200F includes a first base 210, a second base 220, a drive lever 230, a relay link 240, a hook 250, a release lever 260, and a pole 270. The lower lock device 200F includes a plurality of stoppers 311 and 312, a plurality of springs 321 and 322, a plurality of support shafts 331 to 334, and a plurality of connection shafts 341 to 343.

The first base 210 includes a main plate 211 and a sub plate 212 bent with respect to the main plate 211. The main plate 211 and the sub plate 212 each have a plate shape. The angle formed between the main plate 211 and the sub plate 212 is about 90 degrees. The first base 210 is formed by, for example, pressing a metal plate.

The main plate 211 includes a hook guide groove 213 that guides the rotation of the hook 250 and a lever guide groove 214 that guides the rotation of the release lever 260. The hook guide groove 213 has an arc shape centered on the axis of a second support shaft 332, and the lever guide groove 214 has an arc shape centered on the axis of a third support shaft 333. The width of the hook guide groove 213 is larger than the outer diameter of a second connection shaft 342, and the width of the lever guide groove 214 is larger than the outer diameter of a third connection shaft 343. The hook guide groove 213 corresponds to a "first guide groove". A first stopper 311 that limits the operation range of the drive lever 230 and a second stopper 312 that limits the operation range of the release lever 260 are fixed to the main plate 211.

The second base 220 includes a main plate 221 and a sub plate 222 bent with respect to the main plate 221. The main plate 221 and the sub plate 222 each have a plate shape. The angle formed between the main plate 221 and the sub plate 222 is about 90 degrees. That is, the second base 220 has a shape corresponding to that of the first base 210. The second base 220 is formed by, for example, pressing a metal plate. The main plate 221 has a hook guide groove 223 that guides the rotation of the hook 250. The hook guide groove 223 has an arc shape centered on the axis of the second support shaft 332. The hook guide groove 223 corresponds to a "second guide groove".

The first base 210 and the second base 220 are connected in an overlapping state. At this time, there is a gap between the main plate 211 of the first base 210 and the main plate 221 of the second base 220. On the other hand, the sub plate 212 of the first base 210 and the sub plate 222 of the second base 220 are in close contact with each other. For connecting the first base 210 with the second base 220, for example, fastening members such as bolts and rivets may be used.

Figure 5:
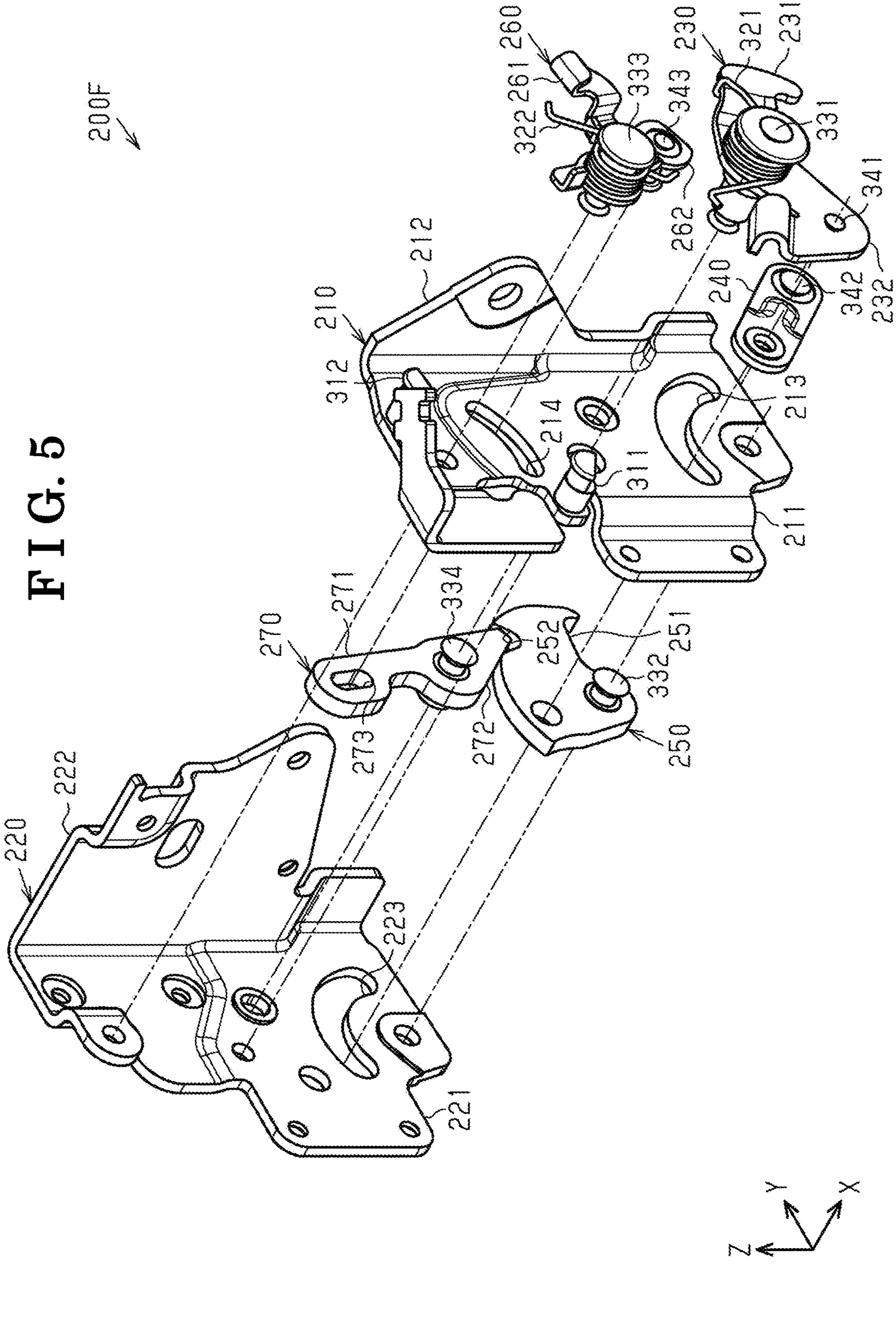
FIG. 5 is an exploded perspective view of the lower lock device.
Figure 6:
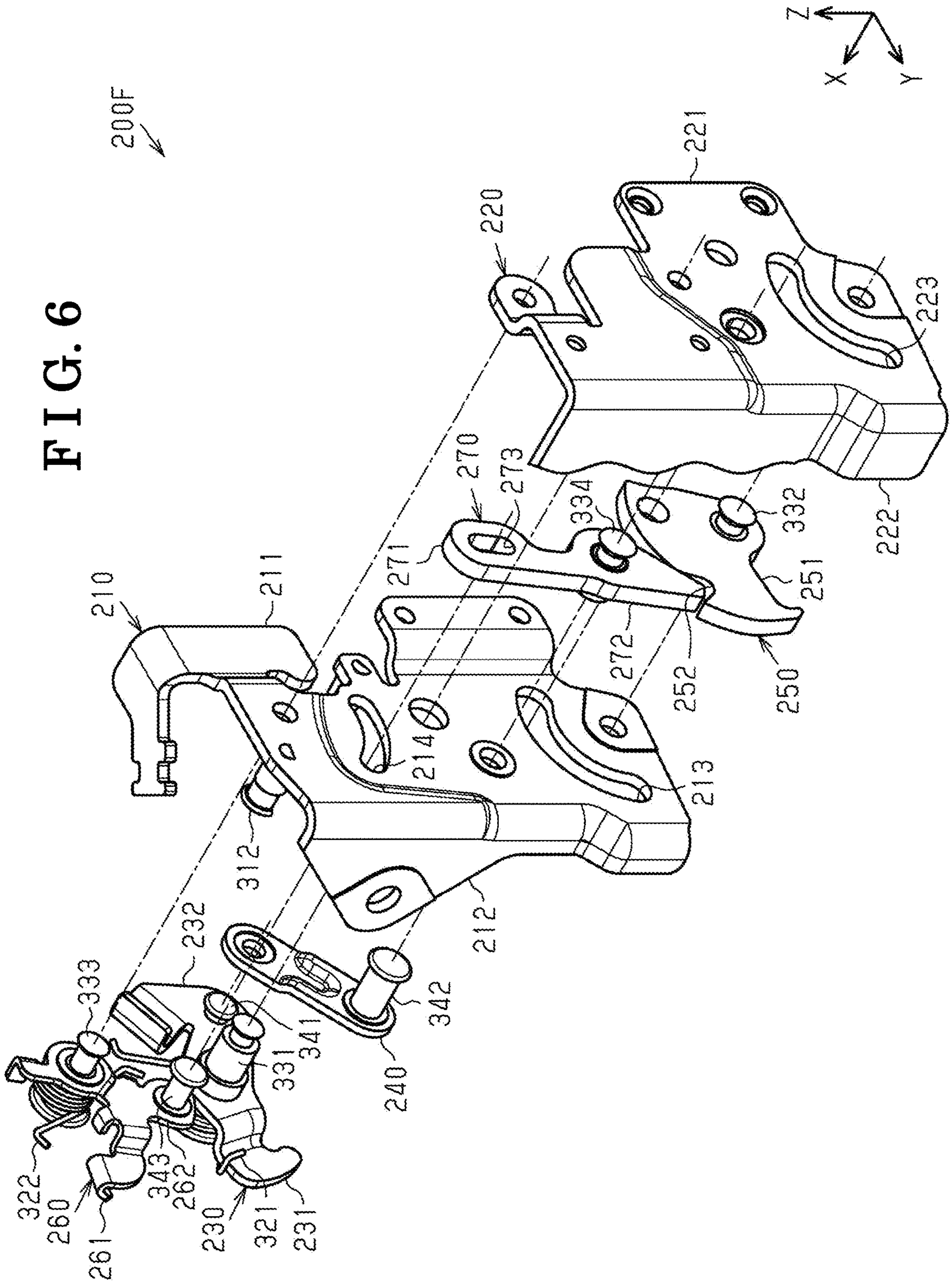
FIG. 6 is an exploded perspective view of the lower lock device.

In the following description, one face of the main plate 211 of the first base 210 in the plate thickness direction illustrated in FIG. 5 is referred to as a front face, and the other face of the main plate 211 of the first base 210 in the plate thickness direction illustrated in FIG. 6 is referred to as a back face. Similarly, one face of the main plate 221 of the second base 220 in the plate thickness direction illustrated in FIG. 5 is referred to as a front face, and the other face of the main plate 221 of the second base 220 in the plate thickness direction illustrated in FIG. 6 is referred to as a back face.

Figure 7:
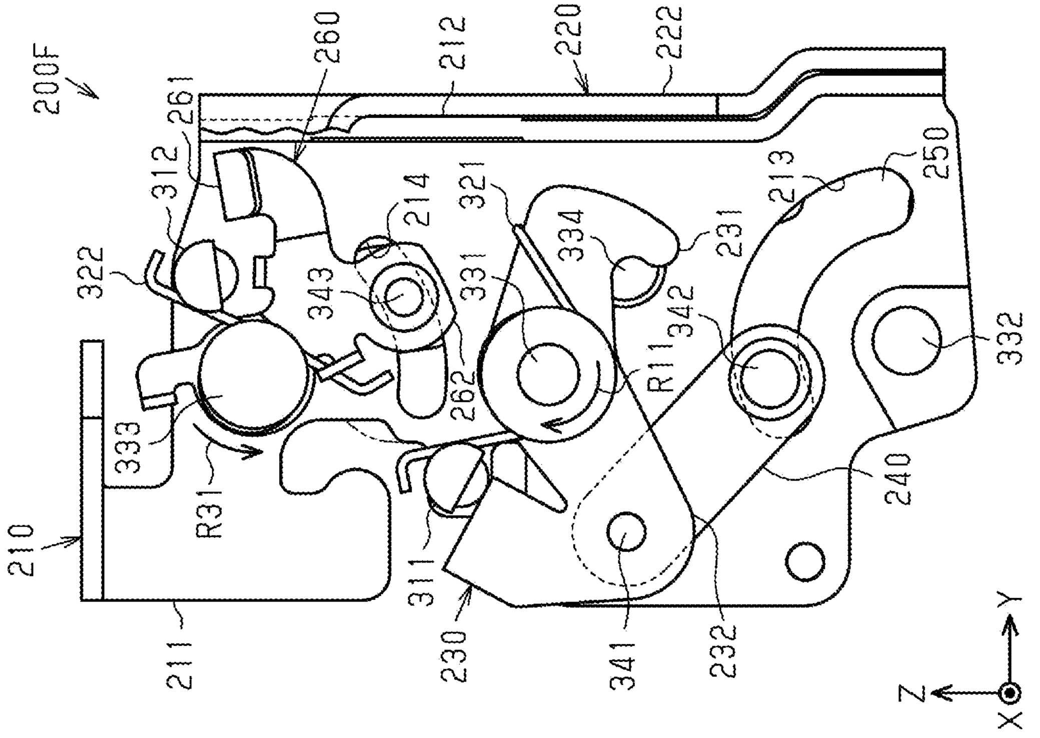
FIG. 7 is a front view of the lower lock device.

As illustrated in FIGS. 5, 6, and 7, the drive lever 230 includes a first lever 231 and a second lever 232 extending in different directions. The drive lever 230 is supported by the first support shaft 331 whose axial direction is the front-rear direction at the center of the main plate 211 of the first base 210 and on the front side of the main plate 211 of the first base 210. Thus, the drive lever 230 is rotatable about the axis of the first support shaft 331. The first support shaft 331 has a distal end fixed to the first base 210 and the second base 220 and a proximal end supporting the drive lever 230. In this respect, it can be said that only one end portion of the first support shaft 331 in the axial direction is fixed.

As illustrated in FIG. 7, the drive lever 230 is biased in a first rotation direction R11 by a first spring 321. In the present embodiment, the first spring 321 is a torsion coil spring, but may be another type of spring as long as the drive lever 230 can be biased in the first rotation direction R11. In the state illustrated in FIG. 7, the drive lever 230 is positioned by coming into contact with the first stopper 311.

As illustrated in FIGS. 5, 6, and 7, the relay link 240 is a link that transmits power from the drive lever 230 to the hook 250. A first end of the relay link 240 in the longitudinal direction is connected to the second lever 232 of the drive lever 230 by a first connection shaft 341 whose axial direction is the front-rear direction. In this way, the relay link 240 and the drive lever 230 are relatively rotatable about the axis of the first connection shaft 341. On the other hand, a second end of the relay link 240 in the longitudinal direction is connected to the hook 250 by the second connection shaft 342 whose axial direction is the front-rear direction. In this way, the relay link 240 and the hook 250 are relatively rotatable about the axis of the second connection shaft 342. As in the drive lever 230, the relay link 240 is located on the front side of the main plate 211 of the first base 210.

Figure 8:
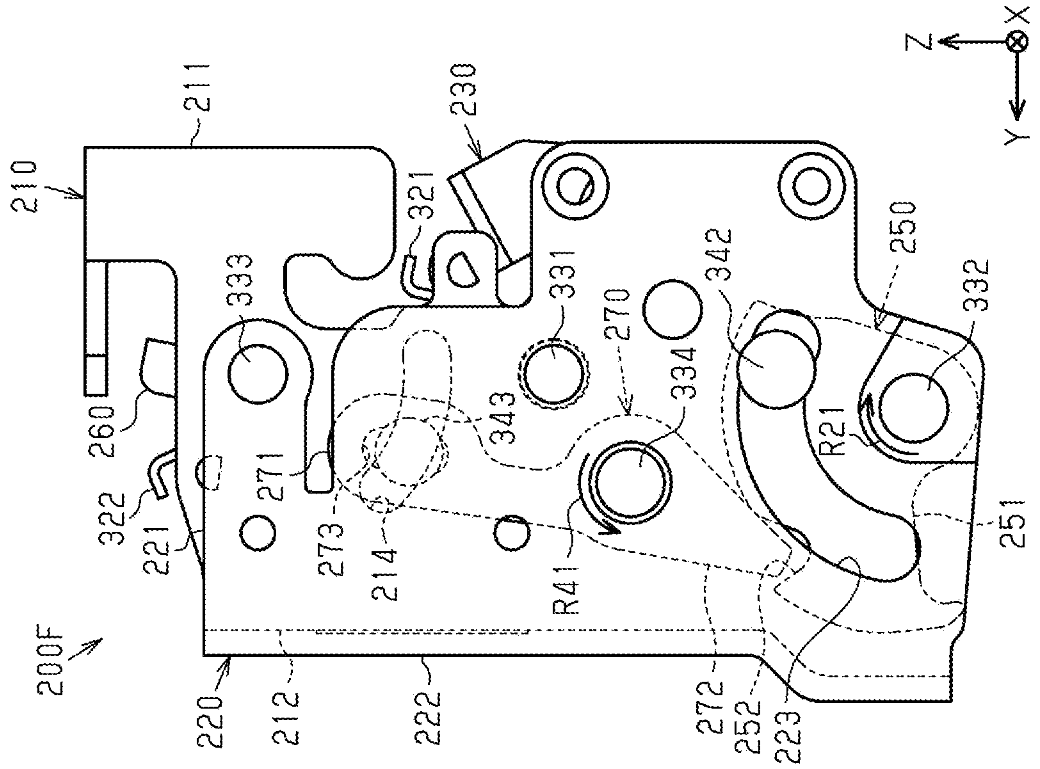
FIG. 8 is a rear view of the lower lock device.

As illustrated in FIGS. 5, 6, and 8, the hook 250 has a plate shape. The thickness of the hook 250 is smaller than the width of the slit 115 of the lower striker structure 100. The hook 250 has a fan shape when viewed from the plate thickness direction, and has a constant shape with respect to the plate thickness direction. The hook 250 includes a first engagement recess 251 that is allowed to be locked to the first engagement portion 120 of the lower striker structure 100 and a second engagement recess 252 that is allowed to be locked to the second engagement portion 116 of the lower striker structure 100. The first engagement recess 251 and the second engagement recess 252 are recessed in a direction approaching each other. That is, the depth direction of the first engagement recess 251 is opposite to the depth direction of the second engagement recess 252. The width, of the first engagement recess 251, orthogonal to the depth direction is substantially constant with respect to the depth direction. The width, of the second engagement recess 252, orthogonal to the depth direction gradually decreases with respect to the depth direction.

The hook 250 is supported by the second support shaft 332 whose axial direction is the front-rear direction between the lower end portion of the main plate 211 of the first base 210 and the lower end portion of the main plate 221 of the second base 220. Thus, the hook 250 is rotatable about the axis of the second support shaft 332 with respect to the first base 210 and the second base 220. As a result, the hook 250 can be displaced between a locking position where the hook is allowed to be locked to the first engagement portion 120 and a retraction position where the hook is not allowed to be locked to the first engagement portion 120. A first end of the second support shaft 332 in the axial direction is fixed to the first base 210, and a second end of the second support shaft 332 in the axial direction is fixed to the second base 220. The second support shaft 332 supports the hook 250 at an intermediate portion in the axial direction. In this respect, it can be said that both end portions of the second support shaft 332 are fixed ends. The second support shaft 332 corresponds to a "hook support shaft".

In the present embodiment, the first base 210, the second base 220, the drive lever 230, the relay link 240, and the hook 250 constitute a so-called four-bar link mechanism. That is, the drive lever 230, the relay link 240, and the hook 250 are interlocked. Therefore, it can be said that the hook 250 is biased in a first rotation direction R21 in that the drive lever 230 is biased in the first rotation direction R11. As a result, in the state illustrated in FIGS. 7 and 8, the hook 250 is located at the retraction position.

As illustrated in FIGS. 7 and 8, the first end of the second connection shaft 342 passes through the hook guide groove 213 of the first base 210, and the second end of the second connection shaft 342 passes through the hook guide groove 223 of the second base 220. At this time, the second connection shaft 342 supports the relay link 240 at a portion penetrating the first base 210, and supports the hook 250 between the first base 210 and the second base 220. The hook guide groove 213 of the first base 210 and the hook guide groove 223 of the second base 220 extend along the rotation locus of the hook 250 in an arc shape centered on the axis of the second support shaft 332. Therefore, when the hook 250 rotates about the axis of the second support shaft 332, the second connection shaft 342 moves along the hook guide groove 213 of the first base 210 and the hook guide groove 223 of the second base 220. In this respect, the second connection shaft 342 corresponds to a "connection shaft", the hook guide groove 213 of the first base 210 corresponds to a "first guide groove", and the hook guide groove 223 of the second base 220 corresponds to a "second guide groove".

As illustrated in FIGS. 5, 6, and 7, the release lever 260 includes a third lever 261 and a fourth lever 262 extending in different directions. The release lever 260 is supported on the upper portion of the first base 210 and on the front face side of the first base 210 by a third support shaft 333 whose axial direction is the front-rear direction. Thus, the release lever 260 is rotatable about the axis of the third support shaft 333 with respect to the first base 210. The third support shaft 333 has a distal end fixed to the first base 210 and the second base 220, and supports the drive lever 230 at a position closer to the proximal end than the second base 220. In this respect, it can be said that only one end portion of the third support shaft 333 in the axial direction is fixed.

As illustrated in FIG. 7, the release lever 260 is biased in a first rotation direction R31 by a second spring 322. In the present embodiment, the second spring 322 is a torsion coil spring, but may be another type of spring as long as the release lever 260 can be biased in the first rotation direction R31.

As illustrated in FIGS. 5, 6, and 8, the pole 270 has a rod shape. The pole 270 has a proximal end portion 271 constituting one end portion in the longitudinal direction and a distal end portion 272 constituting the other end portion in the longitudinal direction. The proximal end portion 271 is provided with a long hole 273 having an oval shape in plan view. The distal end portion 272 is tapered toward the distal end.

The pole 270 is supported by a fourth support shaft 334 whose axial direction is the front-rear direction between the central portion of the main plate 211 of the first base 210 and the central portion of the main plate 221 of the second base 220. At this time, the fourth support shaft 334 penetrates the pole 270.

In this way, the poles 270 are rotatable about the axis of the fourth support shaft 334 with respect to the first base 210 and the second base 220. A first end of the fourth support shaft 334 in the axial direction is fixed to the first base 210, and a second end of the fourth support shaft 334 in the axial direction is fixed to the second base 220. The fourth support shaft 334 supports the pole 270 at an intermediate portion in the axial direction. In this respect, both end portions of the fourth support shaft 334 can be said to be fixed ends.

The proximal end portion 271 of the pole 270 is connected to the fourth lever 262 of the release lever 260 by the third connection shaft 343 whose axial direction is the front-rear direction. At this time, the third connection shaft 343 is inserted through the long hole 273 of the pole 270. In this way, the pole 270 can be displaced relative to the release lever 260.

Here, the third connection shaft 343 connecting the pole 270 and the release lever 260 passes through the lever guide groove 214 of the first base 210. The lever guide groove 214 of the first base 210 extends along the rotation locus of the release lever 260 in that it has an arc shape centered on the axis of the third support shaft 333. Therefore, when the release lever 260 rotates about the axis of the third support shaft 333, the third connection shaft 343 moves along the lever guide groove 214 of the first base 210.

In the present embodiment, the first base 210, the release lever 260, and the pole 270 having the long hole 273 constitute a so-called 4-bar slider crank mechanism. That is, the release lever 260 and the pole 270 are interlocked. Therefore, it can be said that the pole 270 is biased in a first rotation direction R41 in that the release lever 260 is biased in the first rotation direction R31. However, the rotation of the pole 270 in the first rotation direction R41 is restricted by coming into contact with the hook 250.

In the lower lock device 200F, the first support shaft 331, the second support shaft 332, the third support shaft 333, and the fourth support shaft 334 may be fixed to the first base 210 and the second base 220 so as to be relatively rotatable or so as to be relatively non-rotatable. As a method of fixing the first support shaft 331, the second support shaft 332, the third support shaft 333, and the fourth support shaft 334 to the first base 210 and the second base 220, for example, caulking may be used, but welding, fitting, or the like may be used.

As described above, in the present embodiment, as illustrated in FIG. 2, a door lock system 50 includes the lower striker structure 100, the lower lock device 200F of the front door 30F, and the lower lock device 200R of the rear door 30R.

<Action of Present Embodiment>

With reference to FIGS. 1 and 9 to 11, an action when the slide door 30 is operated to close will be described.

As illustrated in FIG. 1, when the slide door 30 is operated to be closed, the front door drive unit 40F closes the front door 30F to the nearly full close position, and the rear door drive unit 40R closes the rear door 30R to the nearly full close position. The nearly full close position is a position slightly shifted in the opening direction from the fully closed position.

When the front door 30F and the rear door 30R reach the nearly full close positions, the rear lock drive device 37R shifts the rear lock device 35R to the locked state. That is, the rear door 30R is closed from the nearly full close position to the fully closed position. When the shift of the rear lock device 35R to the locked state is finished, the front lock drive device 37F shifts the front lock device 35F to the locked state. That is, the front door 30F is operated to be closed from the nearly full close position to the fully closed position.

When the front door 30F is operated to close to the fully closed position in a situation where the rear door 30R is located at the fully closed position, the rear end portion of the front door 30F approaches the front end portion of the rear door 30R. In other words, the center lock device 36F of the front door 30F approaches the center striker 36R of the rear door 30R. As a result, the center lock device 36F is shifted to the locked state.

When the front lock device 35F, the rear lock device 35R, and the center lock device 36F shift to the locked state, the lower lock drive devices 38F and 38R are driven to shift the lower lock devices 200F and 200R to the locked state. Hereinafter, the action of the lower lock device 200F when shifting to the locked state will be described in detail. Since the action of the lower lock device 200R is substantially equal to the action of the lower lock device 200F, the description thereof will be omitted.

Figure 9:
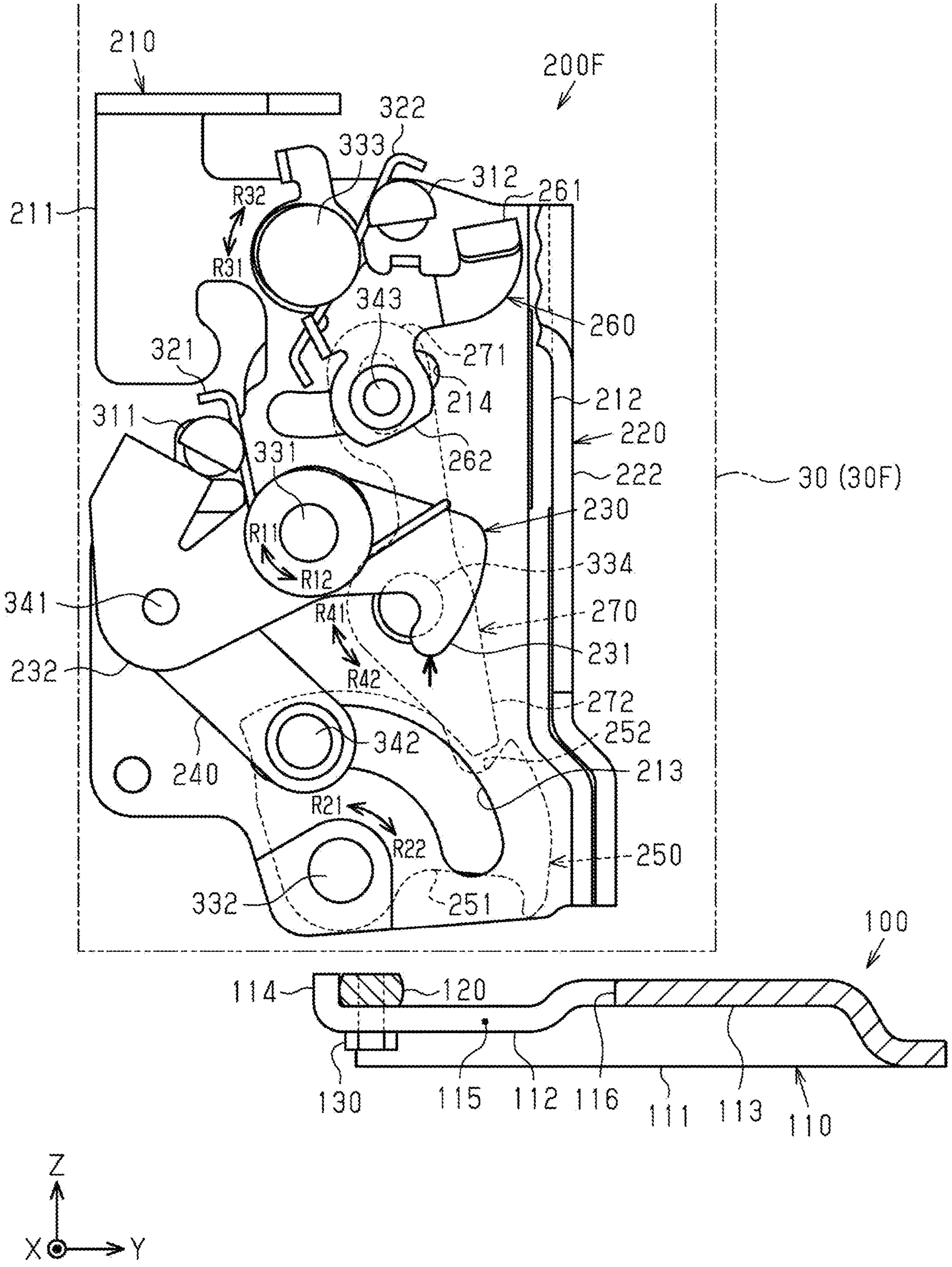
FIG. 9 is a schematic view for explaining an action of the lower striker structure and the lower lock device.

FIG. 9 illustrates a positional relationship between the lower lock device 200F and the lower striker structure 100 when the front lock device 35F, the rear lock device 35R, and the center lock device 36F shift to the locked state. As illustrated in FIG. 9, before the lower lock device 200F shifts to the locked state, the lower end portion of the front door 30F is positioned outward in the width direction with respect to the vehicle body 20. The position of the front door 30F is related to the magnitude of the elastic modulus of the seal member positioned between the door opening 21 and the front door 30F, the position of the center of gravity of the front door 30F, the support mode of the front door 30F, and the like.

When shifting the lower lock device 200F to the locked state, the lower lock drive device 38F transmits a load indicated by a solid arrow in FIG. 9 to the first lever 231 of the drive lever 230. Then, the drive lever 230 rotates in a second rotation direction R12, so that the relay link 240 and the hook 250 operate. At this time, the relay link 240 relays the power transmitted from the lower lock drive device 38F to the hook 250. As a result, the hook 250 rotates in a second rotation direction R22. When the hook 250 rotates, the distal end portion 272 of the pole 270 slides on the back face of the hook 250. When the hook 250 rotates, the first end of the second connection shaft 342 slides on the hook guide groove 213 of the first base 210, and the second end of the second connection shaft 342 slides on the hook guide groove 223 of the second base 220.

When the rotation of the drive lever 230 in the second rotation direction R12 is continued by the lower lock drive device 38F, the first engagement recess 251 of the hook 250 comes into contact with the first engagement portion 120 of the lower striker structure 100. When the rotation of the hook 250 in the second rotation direction R22 is continued even after the hook 250 comes into contact with the first engagement portion 120, the first engagement recess 251 of the hook 250 and the first engagement portion 120 slide. At this time, the hook 250 pushes the first engagement portion 120 outward in the width direction. Here, the lower striker structure 100 including the first engagement portion 120 cannot be displaced, but the lower end portion of the front door 30F can be slightly displaced in the width direction. Therefore, the lower lock device 200F is displaced inward in the width direction with respect to the first engagement portion 120 by the reaction force acting on the hook 250. That is, the lower end portion of the front door 30F is displaced inward in the width direction with respect to the lower striker structure 100.

Figure 10:
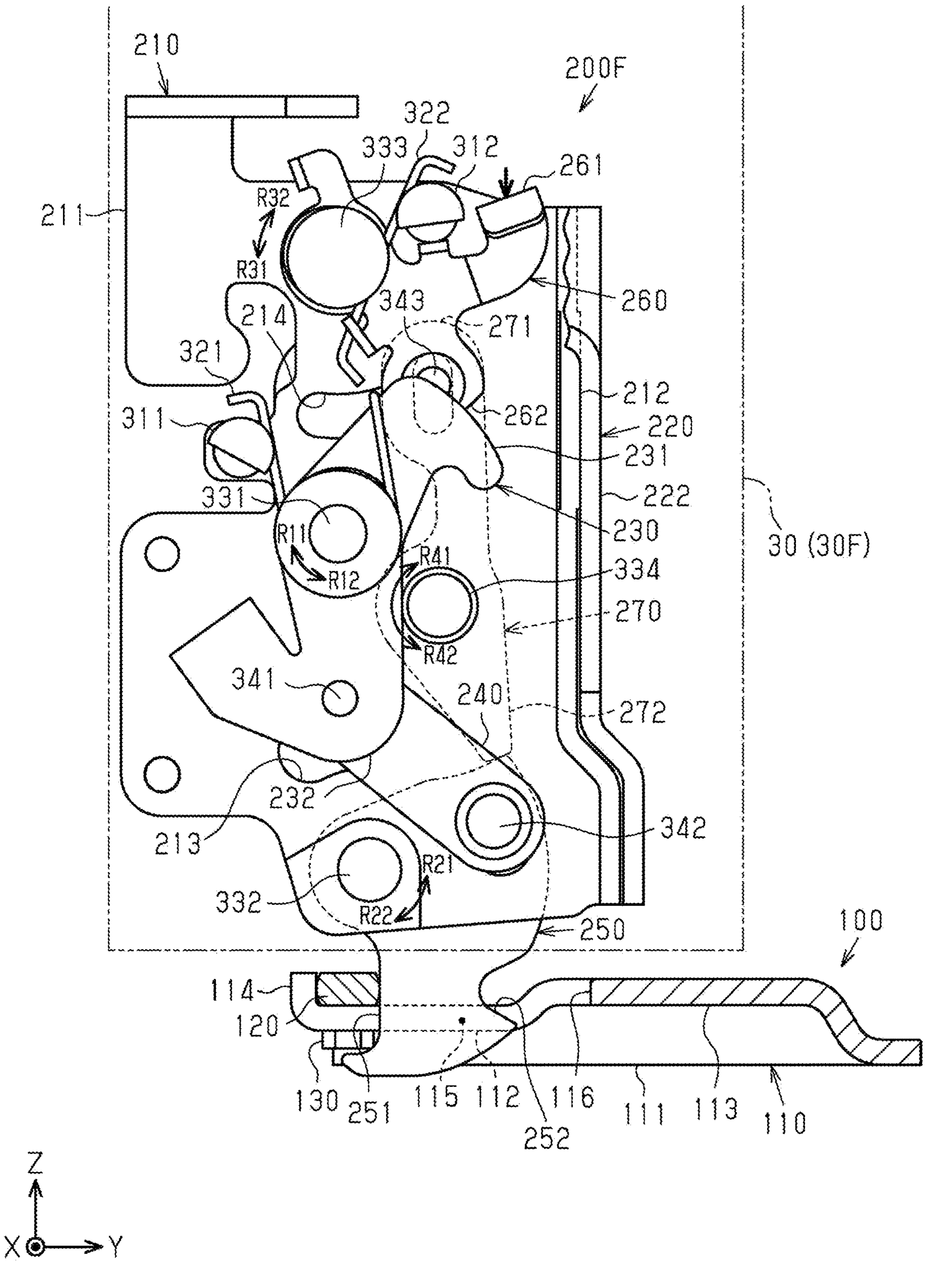
FIG. 10 is a schematic view for explaining the action of the lower striker structure and the lower lock device.

As illustrated in FIG. 10, when the hook 250 is completely locked to the first engagement portion 120, the transition of the lower lock device 200F to the locked state is completed. At this time, the first engagement portion 120 is completely accommodated in the first engagement recess 251 of the hook 250. The position of hook 250 shown in FIG. 10 is a locking position. When the shift of the lower lock device 200F to the locked state is completed, the driving of the lower lock drive device 38F is stopped.

When the hook 250 rotates to the locking position, the distal end portion 272 of the pole 270 does not slide on the back face of the hook 250. Therefore, the pole 270 rotates in the first rotation direction R41 according to the biasing force of the second spring 322. Then, the distal end portion 272 of the pole 270 is locked to the hook 250, so that the hook 250 cannot rotate in the first rotation direction R21. That is, the drive lever 230 cannot rotate in the first rotation direction R11 according to the biasing force of the first spring 321. Therefore, even after the driving of the lower lock drive device 38F is stopped, the state in which the hook 250 is locked to the first engagement portion 120 is maintained. Thus, the closing operation of the slide door 30 is completed.

When the hook 250 rotates to the locking position, the hook 250 is positioned between the first engagement portion 120 and the second engagement portion 116 in the width direction. At this time, the first engagement recess 251 of the hook 250 and the first engagement portion 120 are in contact with each other in the width direction. On the other hand, the second engagement recess 252 and the second engagement portion 116 of the hook 250 are located apart from each other in the width direction. In other words, the second engagement recess 252 of the hook 250 faces the second engagement portion 116 in the width direction.

Next, an action when an impact acts on the slide door 30 when the slide door 30 is located at the fully closed position will be described.

Figure 11:
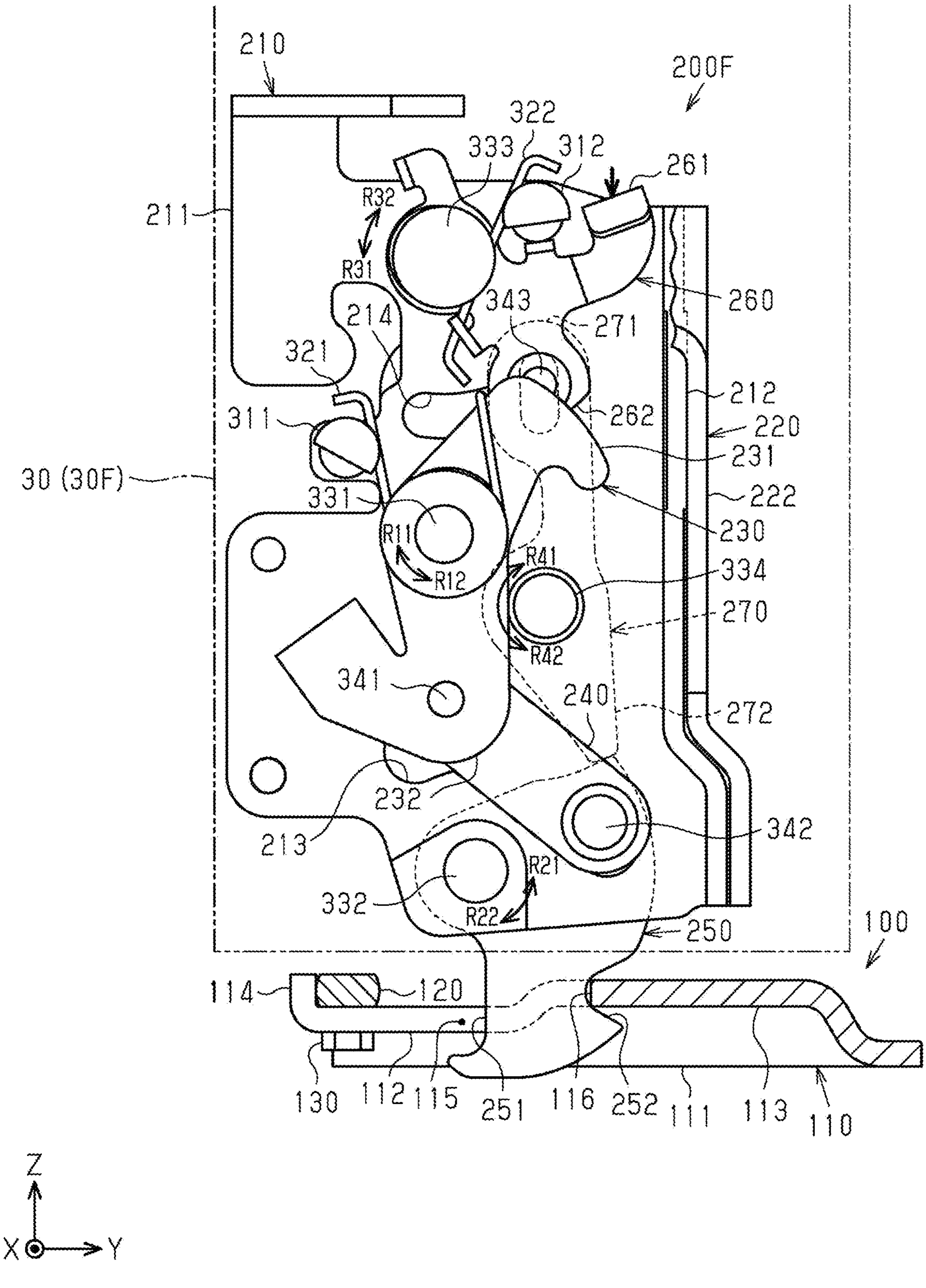
FIG. 11 is a schematic view for explaining the action of the lower striker structure and the lower lock device.

For example, when another vehicle collides with a side face of the vehicle 10, an impact directed inward in the width direction may act on the front door 30F. In this case, as illustrated in FIG. 11, the front door 30F is displaced inward in the width direction with respect to the vehicle body 20. At this time, the hook 250 of the lower lock device 200F comes into contact with the second engagement portion 116 of the lower striker structure 100. Specifically, the second engagement portion 116 enters the second engagement recess 252 of the hook 250. Then, the second engagement portion 116 comes into contact with the bottom face of the second engagement recess 252 of the hook 250.

In this way, when the front door 30F tries to move inward in the width direction, the hook 250 of the lower lock device 200F is locked to the second engagement portion 116 of the lower striker structure 100. As a result, inward movement of the front door 30F in the width direction is restricted.

That is, after the hook 250 of the lower lock device 200F is locked to the second engagement portion 116 of the lower striker structure 100, the front door 30F is less likely to be displaced in the direction of reducing the volume of the vehicle interior.

Finally, the action when the slide door 30 is opened will be described.

As illustrated in FIG. 1, when the slide door 30 is opened, the front lock drive device 37F and the rear lock drive device 37R are driven. As a result, the front lock device 35F and the rear lock device 35R are shifted to the released state. At this time, the remote controller 39F transmits the power transmitted from the front lock device 35F to the center lock device 36F.

As a result, the center lock device 36F is shifted to the released state. In addition, the remote controller 39F transmits the power transmitted from the front lock device 35F to the lower lock device 200F, and the remote controller 39R transmits the power transmitted from the rear lock device 35R to the lower lock device 200R. Hereinafter, the action of the lower lock device 200F at the time of shifting to the released state will be described in detail.

As indicated by the solid arrow in FIG. 10, the power transmitted from the remote controller 39F is transmitted to the third lever 261 of the release lever 260. Then, the release lever 260 rotates in a second rotation direction R32, so that the pole 270 rotates in a second rotation direction R42. That is, the distal end portion 272 of the pole 270 moves in a direction away from the hook 250, so that the distal end portion 272 of the pole 270 is not locked to the hook 250. As a result, the hook 250 rotates in the first rotation direction R21 according to the biasing force of the first spring 321, and the hook 250 is not locked to the first engagement portion 120. At this time, the hook 250 rotates from the locking position to the retraction position. In this way, the shift of the lower lock device 200F to the released state is completed. Similarly, the lower lock device 200R is shifted to the released state based on the power transmitted from the remote controller 39F. Thereafter, the front door drive unit 40F opens the front door 30F, and the rear door drive unit 40R opens the rear door 30R. Thus, the opening operation of the slide door 30 is completed.

<Effects of Present Embodiment>

(1) A vehicle door lock system is applied to a vehicle including a vehicle body having a door opening on at least one side of the vehicle in a width direction and a door that opens and closes the door opening, and the vehicle door lock system includes a striker structure installed at one of the vehicle body and the door, and a door lock device installed at the other of the vehicle body and the door, wherein the striker structure includes a first engagement portion and a second engagement portion disposed away from each other in the width direction, wherein the door lock device includes a hook that is displaced between a locking position where the hook is allowed to be locked to the first engagement portion and a retraction position where the hook is not allowed to be locked to the first engagement portion, and wherein the hook is positioned between the first engagement portion and the second engagement portion in the width direction when positioned at the locking position.

According to the above configuration, the hook 250 of each of the lower lock devices 200F and 200R is locked to the first engagement portion 120 at the locking position. Therefore, the door lock system 50 can restrain the slide door 30 with respect to the vehicle body 20. The hook 250 is located between the first engagement portion 120 and the second engagement portion 116 at the locking position. Therefore, when the hook 250 relatively moves in the direction away from the first engagement portion 120 due to the action of the impact directed in the width direction on the slide door 30, the hook 250 relatively moves in the direction approaching the second engagement portion 116. That is, the hook 250 is not locked to the first engagement portion 120, but is locked to the second engagement portion 116.

Therefore, even when an impact acts on the slide door 30, the door lock system 50 can maintain the restrained state of the slide door 30 with respect to the vehicle body 20. In addition, the door lock system 50 can suppress continuing movement of the slide door 30 in a direction of reducing the volume of the vehicle interior. Thus, the vehicle door lock system can restrain the door to the vehicle body.

(2) In the vehicle door lock system, the hook includes an engagement recess that is allowed to accommodate the second engagement portion at a portion facing the second engagement portion in the width direction when positioned at the locking position.

According to the above configuration, when the hook 250 is provided with the convex configuration that engages with the second engagement portion 116, it is necessary to prevent the convex configuration from contacting other configurations when the hook 250 rotates (displaces) between the locking position and the retraction position. For example, it is necessary to enlarge the slit 115 so that the rotating hook 250 does not contact the base plate 110 of the lower striker structure 100. In this regard, in the door lock system 50, the hook 250 has the second engagement recess 252 that is allowed to accommodate the second engagement portion 116. Therefore, when the hook 250 rotates (displaces) between the locking position and the retraction position, the second engagement recess 252 is less likely to come into contact with other configurations.

(3) In the vehicle door lock system, the engagement recess of the hook gradually narrows in width orthogonal to a depth direction of the engagement recess from an opening of the engagement recess to a bottom of the engagement recess.

According to the above configuration, the second engagement recess 252 of the hook 250 gradually narrows from the opening of the second engagement recess 252 toward the bottom of the second engagement recess 252. Therefore, when the hook 250 relatively approaches the second engagement portion 116 of the lower striker structure 100 as an impact acts on the slide door 30, the second engagement portion 116 is easily guided to the bottom of the second engagement recess 252. That is, the door lock system 50 can easily lock the hook 250 to the second engagement portion 116 when an impact acts on the door.

(4) The vehicle door lock system includes a hook support shaft that rotatably supports the hook with a front-rear direction of the vehicle as an axial direction, a first base that supports a first end of the hook support shaft, and a second base that supports a second end of the hook support shaft.

According to the above configuration, both ends of the second support shaft 332 are supported by the first base 210 and the second base 220. Therefore, even when a load acts on the second support shaft 332 via the hook 250, the second support shaft 332 is less likely to be deformed. The same applies to the fourth support shaft 334 in relation to the pole 270.

(5) The vehicle door lock system includes a relay link that relays power transmitted from a drive unit to the hook, and a connection shaft that connects the hook with the relay link in a relatively rotatable manner, wherein the first base has a first guide groove extending along a rotation locus of the hook, wherein the second base has a second guide groove extending along a rotation locus of the hook, and wherein when the hook rotates between the locking position and the retraction position, a first end of the connection shaft slides on the first guide groove, and a second end of the connection shaft slides on the second guide groove.

According to the above configuration, both end portions of the second connection shaft 342 are supported by the first base 210 and the second base 220 via the hook guide groove 213 and 223, respectively. Therefore, even when a load acts on the second connection shaft 342 via the hook 250, the second connection shaft 342 is less likely to be deformed.

(6) In the vehicle door lock system, the door lock device is installed at a lower end portion of the door, and wherein the striker structure is installed below the door opening of the vehicle body.

According to the above configuration, the vehicle door lock system can restrain the lower end portion of the door to the vehicle body.

(7) The door includes a front door that opens and closes while sliding for a front half of the door opening and a rear door that opens and closes while sliding for a rear half of the door opening, wherein the vehicle door lock system includes a front door lock device as the door lock device installed at the front door, and a rear door lock device as the door lock device installed at the rear door, and wherein the striker structure includes a first front engagement portion and a second front engagement portion as the first engagement portion and the second engagement portion associated with the front door lock device, and a first rear engagement portion and a second rear engagement portion as the first engagement portion and the second engagement portion associated with the rear door lock device.

According to the above configuration, the door lock system 50 can restrain the lower end portions of the front door 30F and the rear door 30R to the vehicle body 20. That is, the door lock system 50 can restrain the front door 30F and the rear door 30R to the vehicle body 20 even when the vehicle 10 does not include the center pillar.

<Modifications>

The present embodiment can be modified as follows. The embodiment and the following modification examples can be implemented in combination with each other within a range not technically contradictory.

- In the lower striker structure 100, the fixing mode of the first engagement portion 120 to the base plate 110 can be appropriately changed. For example, the first engagement portion 120 may be welded to the base plate 110.
- In the lower striker structure 100, the shapes of the first engagement portion 120 and the second engagement portion 116 can be appropriately changed. For example, the first engagement portion 120 and the second engagement portion 116 may be generally U-shaped strikers. As in the first engagement portion 120, the second engagement portion 116 may be a shaft member.
- The lower striker structure 100 may be separated at a central portion in the front-rear direction. That is, the door lock system 50 may include a lower striker structure for the front door 30F and a lower striker structure for the rear door 30R.
- The hooks 250 of the lower lock devices 200F and 200R can also be configured to linearly reciprocate between the locking position and the retraction position. In this case, each of the lower lock devices 200F and 200R preferably includes a transmission mechanism that converts the rotational motion of the drive lever 230 into the linear motion of the hook 250. In this case, each of the hook guide grooves 213 and 223 preferably extends linearly along the movement locus of the hook 250.
- The shape of the hook 250 of each of the lower lock devices 200F and 200R can be appropriately changed as long as it can be locked to the first engagement portion 120 of the lower striker structure 100 when rotating from the retraction position to the locking position. For example, in the above embodiment, as illustrated in FIG. 10, the first engagement portion 120 of the base plate 110 has a convex shape, and the first engagement recess 251 of the hook 250 has a concave shape. On the other hand, in the modification, the first engagement portion 120 of the base plate 110 may have a concave shape, and the first engagement recess 251 of the hook 250 may have a convex shape. The first engagement recess 251 may be omitted from the hook 250.
- The shape of the hook 250 of each of the lower lock devices 200F and 200R can be appropriately changed as long as it can be locked to the second portion 112 when moving from the locking position toward the second portion 112 of the lower striker structure 100. For example, in the above embodiment, as illustrated in FIG. 11, the second engagement portion 116 of the base plate 110 has a convex shape, and the second engagement recess 252 of the hook 250 has a concave shape. On the other hand, in the modification, the second engagement portion 116 of the base plate 110 may have a concave shape, and the second engagement recess 252 of the hook 250 may have a convex shape. The second engagement recess 252 may be omitted from the hook 250.
- The second base 220 of each of the lower lock devices 200F and 200R can be omitted. In this case, the second support shaft 332 that rotatably supports the hook 250 and the fourth support shaft 334 that rotatably supports the pole 270 are supported only by the first base 210. That is, only one end portions of the second support shaft 332 and the fourth support shaft 334 in the axial direction are supported by the first base 210.
- In the lower lock devices 200F and 200R, the hook guide groove 213 and the lever guide groove 214 can be omitted from the first base 210. Similarly, the hook guide groove 223 can be omitted from the second base 220.
- The lower lock devices 200F and 200R may be installed on the floor of the vehicle body 20. In this case, the front portion of the lower striker structure 100 is preferably installed at the lower end portion of the front door 30F, and the rear portion of the lower striker structure 100 is preferably installed at the lower end portion of the rear door 30R.
- The "door lock device" may be an upper lock device installed at the upper portion of the front door 30F. In this case, the "striker structure" is preferably installed above the door opening 21 of the vehicle body 20.
- The vehicle 10 may be a vehicle including one of the front door 30F and the rear door 30R.
- Each of the front door 30F and the rear door 30R may be a swing door that rotates about an axis extending in the vertical direction. In this case, the rotation axis of the front door 30F is preferably provided at the front end portion of the front door 30F, and the rotation axis of the rear door 30R is preferably provided at the rear end portion of the rear door 30R.
- The vehicle body 20 may have door openings 21 on both sides in the width direction. In this case, the vehicle 10 preferably includes the front door 30F and the rear door 30R associated with the right door opening 21, and the front door 30F and the rear door 30R associated with the left door opening 21.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle door lock system applied to a vehicle including a vehicle body having a door opening on at least one side of the vehicle in a width direction and a door that opens and closes the door opening, the vehicle door lock system comprising:
- a striker structure installed at one of the vehicle body and the door; and
- a door lock device installed at the other of the vehicle body and the door, wherein
- the striker structure includes a base plate, a slit in the base plate that extends in the width direction, a first engagement portion at a first end of the slit, and a second engagement portion disposed away from the first engagement portion in the width direction at a second end of the slit,
- the door lock device includes a hook that is displaced between a locking position where the hook is allowed to be locked to the first engagement portion and a retraction position where the hook is not allowed to be locked to the first engagement portion, and
- the hook is positioned between the first engagement portion and the second engagement portion in the width direction when positioned at the locking position.

2. The vehicle door lock system according to claim 1, wherein
- the hook includes an engagement recess that is allowed to accommodate the second engagement portion at a portion facing the second engagement portion in the width direction when positioned at the locking position.

3. The vehicle door lock system according to claim 2, wherein
- the engagement recess of the hook gradually narrows in width orthogonal to a depth direction of the engagement recess from an opening of the engagement recess to a bottom of the engagement recess.

4. The vehicle door lock system according to claim 1, further comprising:
- a hook support shaft that rotatably supports the hook with a front-rear direction of the vehicle as an axial direction;
- a first base that supports a first end of the hook support shaft; and
- a second base that supports a second end of the hook support shaft.

5. The vehicle door lock system according to claim 4, further comprising:
- a relay link that relays power transmitted from a drive unit to the hook; and
- a connection shaft that connects the hook with the relay link in a relatively rotatable manner, wherein
- the first base has a first guide groove extending along a rotation locus of the hook, wherein
- the second base has a second guide groove extending along a rotation locus of the hook, and wherein
- when the hook rotates between the locking position and the retraction position, a first end of the connection shaft slides on the first guide groove, and a second end of the connection shaft slides on the second guide groove.

6. The vehicle door lock system according to claim 1, wherein
- the door lock device is installed at a lower end portion of the door, and wherein the striker structure is installed below the door opening of the vehicle body.

7. The vehicle door lock system according to claim 6, wherein
- the door includes a front door that opens and closes while sliding for a front half of the door opening and a rear door that opens and closes while sliding for a rear half of the door opening, wherein
- the vehicle door lock system includes
- a front door lock device as the door lock device installed at the front door, and
- a rear door lock device as the door lock device installed at the rear door, and wherein
- the striker structure includes
- a first front engagement portion and a second front engagement portion as the first engagement portion and the second engagement portion associated with the front door lock device, and
- a first rear engagement portion and a second rear engagement portion as the first engagement portion and the second engagement portion associated with the rear door lock device.

* * * * *